United States Patent [19]

Heilala

[11] Patent Number: 4,842,286
[45] Date of Patent: Jun. 27, 1989

[54] SLIDE RING SEAL WITH CIRCUMFERENTIALLY VARIABLY-BEVELED COUNTER-SURFACE ON A SHRINK FITTED SLIDE RING THEREOF

[75] Inventor: Antti-Jussi Heilala, Starnberg, Fed. Rep. of Germany

[73] Assignee: OY Safematic Ltd., Muurame, Finland

[21] Appl. No.: 97,873

[22] Filed: Sep. 17, 1987

[30] Foreign Application Priority Data

Oct. 27, 1986 [FI] Finland .................. 864339

[51] Int. Cl.⁴ .................. F16J 15/34; F16J 15/38
[52] U.S. Cl. .................. 277/38; 277/81 R; 277/81 S; 277/82; 277/85; 277/93 SD; 277/96.1; 277/195; 277/198; 277/215
[58] Field of Search .................. 277/81 S, 82, 81 R, 277/85, 87, 93 SD, 198, 215, 96.1, 38, 194, 195; 285/381

[56] References Cited

U.S. PATENT DOCUMENTS

| | | |
|---|---|---|
| 2,723,868 | 11/1955 | Hartranft .................. 277/81 R X |
| 3,770,181 | 11/1973 | Stahl .................. 277/81 R |
| 4,175,753 | 11/1979 | Wentworth, Jr. .................. 277/87 |
| 4,261,581 | 4/1981 | Hershey .................. 277/81 R X |
| 4,424,975 | 1/1984 | Heilala . |
| 4,613,142 | 9/1986 | Heilala . |
| 4,659,092 | 4/1987 | Wallace .................. 277/81 R X |
| 4,688,806 | 8/1987 | Heilala . |
| 4,700,953 | 10/1987 | Kuusela .................. 277/81 R X |

*Primary Examiner*—Allan N. Shoap
*Attorney, Agent, or Firm*—Cushman, Darby & Cushman

[57] ABSTRACT

A slide ring seal for sealing a machine part which is rotatable with respect to a wall. The seal comprises seating rings provided with slide rings, the seating rings being so arranged with respect to each other that the sealing slide faces of the slide rings are pressed against each other and rotate with respect to each other. Each slide ring is fastened to its seating ring by means of a shrink fit in such a way that the slide ring is exposed to a radially-acting press force. In order to provide the slide face with a wave shape in the peripheral direction, an axial counter-surface of the seating ring, which in the shrink fit makes contact with an axial peripheral surface of the slide ring, is an axially discontinuous surface.

5 Claims, 2 Drawing Sheets

SLIDE RING SEAL WITH CIRCUMFERENTIALLY VARIABLY-BEVELED COUNTER-SURFACE ON A SHRINK FITTED SLIDE RING THEREOF

BACKGROUND OF THE INVENTION

The invention relates to a slide ring seal for sealing a machine part rotatable with respect to a wall, comprising seating rings provided with slide rings and so fitted with respect to each other that the sealing slide faces of the slide rings are pressed against each other and rotate with respect to each other, each slide ring being attached to its seating ring by means of a shrink fit so that a radially acting press force is exerted on the slide ring.

This kind of seals is well-known in various technical fields. Slide ring seals are particularly well suited for use in pumps intended for pumping liquids containing solids and impurities in the process industries, for example.

The slide rings of slide ring seals are today usually manufactured of ceramic materials. Silicon carbide has proved to be an excellent material since it has good slide properties and a high heat conductivity; further, it is an extremely hard material. Seating rings are generally manufactured of an acid-proof steel, for instance. It is clear that the materials, however, are always chosen separately for each application.

In prior solutions, the slide ring has been attached to the seating ring thereof by means of a shrink fit in such a way that the seating ring is first heated so that it expands to such an extent that it is possible to fit the slide ring in a recess formed in the seating ring. When the seating ring cools, the slide ring gets squeezed and is thus fastened in place. A disadvantage of this way of fastening is that strains and distortions are formed in the slide ring, and these may disturb the operation of the seal. This disadvantage becomes apparent particularly in connection with slide rings manufactured of silicon carbide, because the coefficient of heat expansion of silicon carbide is low as compared with that of steel.

The above disadvantages result from the fact that in prior shrink fits the slide ring is exposed to a radial press force from the entire periphery thereof, which distorts the slide face into an outwardly or inwardly conical shape. However, a conical slide face does not operate in the best possible way, because the contact between the slide faces is thereby reduced into a mere linear contact, which, in turn, causes the slide ring to be exposed to forceful heat stresses and strain states.

The conical slide face has been compensated for by grinding the face into planar shape. The distortion, however, cannot be totally compensated for by grinding, because the actual operating temperature of the seal is often higher than the grinding temperature, whereby the seating ring is again expanded to a greater degree than the slide ring. The slide face is thereby distorted into a cup-like shape and makes contact with the counter surface on its outer periphery only.

Attempts have also been made to prevent the slide face from being distorted by means of a suitable choice of materials as well as by means of various joint constructions. Examples of such joint constructions would be the solutions disclosed in Finnish patent application 850,190 and U.S. Pat. No. 4,261,581.

Furthermore, it has been found out that completely planar slide faces are not optimal at high speeds or high pressures, in particular as slide faces rubbing against each other cause intense friction heat. To reduce the friction, solutions have been suggested by means of which a lubricant can be introduced between the slide faces. Such solutions include the structure disclosed in German Patent Specification 1,221,865, in which lubrication grooves have been formed on the slide face. Such lubrication grooves cause the lubricant to be introduced intermittently between the slide faces, simultaneously diminishing the abrasive surface and transmitting away the friction heat. A similar operation has been aimed at by machining the slide face of the slide ring into a wave-like shape, whereby more lubricant than usual enters between the slide faces.

A disadvantage of the prior solutions mentioned above is that they are difficult to realize, which, in turn, increases the manufacturing costs. A problem with the lubrication grooves is that the impurities of the lubricant easily wear the slide faces.

SUMMARY OF THE INVENTION

The object of the invention is to provide a slide ring seal which can be provided with a wave shape, advantageous in view of the lubrication, in a simple manner. This is achieved by means of a slide ring seal according to the invention, which is characterized in that an axial counter surface of the seating ring which in the shrink fit makes contact with an axial peripheral surface of the slide ring is an angularly (i.e., circumferentially) discontinuous surface.

An advantage of the invention is that it is simple, because the peripheral height differences of the slide face required by hydrodynamic lubrication are provided automatically without any separate machining of the surface. Consequently, the manufacturing costs are advantageous. Owing to the simple realization, the operating costs, too, are advantageously low.

BRIEF DESCRIPTION OF THE DRAWINGS

In the following, the invention will be described in more detail by means of the preferred embodiments shown in the attached drawings wherein.

DETAILED DESCRIPTION

Figure 1:
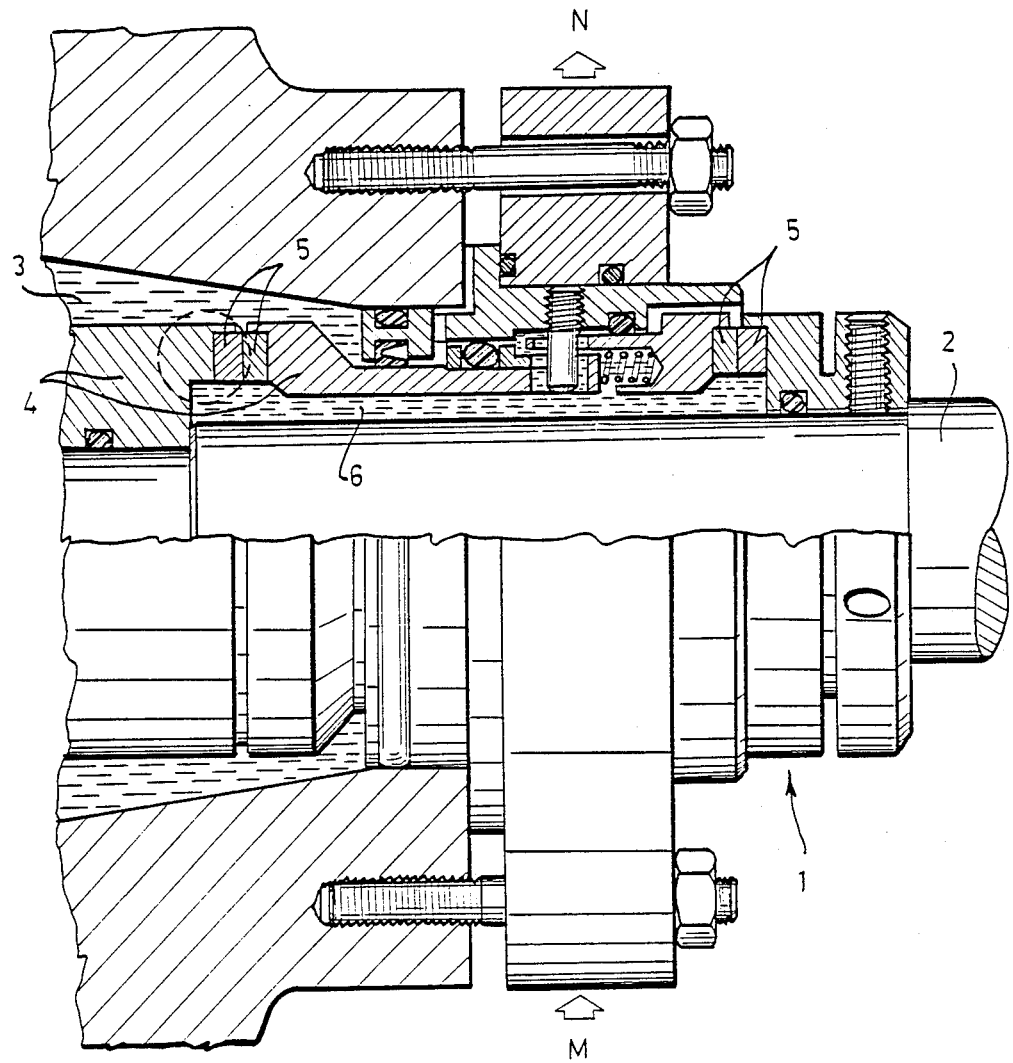
FIG. 1 is a fragmentary side elevational view, with parts broken away and longitudinally sectioned, of an example of a known slide ring seal structure.
Figure 2:
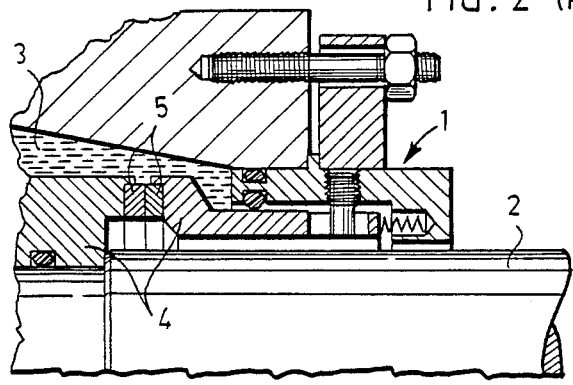
FIG. 2 is a fragmentary longitudinal sectional view of an example of another known slide ring seal structure.

FIGS. 1 and 2 illustrate generally two prior slide ring seal structures. In FIGS. 1 and 2, corresponding parts are indicated with the same reference numerals. The body part of the seal structure is thus indicated generally with the reference numeral 1. A rotatable machine part such as a pump shaft is indicated with the reference numeral 2. The product to be pumped, in turn, is indicated with the reference numeral 3. The seating rings of the slide ring seal are indicated with the reference numeral 4 and the slide rings fastened to the seating rings correspondingly with the reference numeral 5.

In the embodiment of FIG. 1, a sealing liquid forming a lubrication film between the slide faces of the slide rings 5 is indicated with the reference numeral 6. In FIG. 1, the inlet and outlet points of the sealing liquid are indicated generally by means of the arrows M and N respectively.

The matters set forth in connection with FIGS. 1 and 2 are completely obvious to one skilled in the art, so the structure according to these figures will not be described more closely in this connection.

Figure 3:
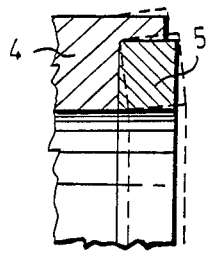
FIG. 3 is an enlarged fragmentary longitudinal sectional view of a slide ring fastening solution used in connection with the known structures of FIGS. 1 and 2.

The detail shown generally on enlarged scale in FIG. 3 is indicated by means of a circle in FIG. 1 and 2. It is, however, obvious that FIG. 3 may illustrate any slide ring shown in FIGS. 1 and 2. The same reference numerals as in FIGS. 1 and 2 are used in FIG. 3 at corresponding points.

In the known solution of FIG. 3, the slide ring 5 is fastened to its seating ring 4 by means of a radially acting shrink fit. The shrink fit is formed in a known manner by heating the seating ring 4 so that is expands. The slide ring 5 is thereafter fitted in the expanded seating ring, which shrinks while it cools so that the slide ring 5 is fastened in the seating ring 4. In FIG. 3, the continuous lines represent a situation when the slide ring 5 has been fitted in the seating ring 4 and the broken lines a situation after the cooling of the seating ring.

It is obvious that the situation shown by broken lines in FIG. 3 is strongly exaggerated. Distortions of such dimensions do not actually occur. However, it is a fact that the slide face of the slide ring 5, which face is represented by the right-hand free face in FIG. 3, is distorted in principle similarly as shown in FIG. 3. The flare formed in the slide ring 5 after the cooling can be removed by grinding the slide face even. The problem, however, cannot be eliminated by this grinding, because in practice the slide ring 5 will be distorted under operating conditions in which the temperature exceeds the grinding temperature, which is due to the face that the seating ring 4 expands, and, as a result, the press force exerted on the slide ring 5 is decreased. These phenomena are completely obvious in the art.

It is further to be noted that the slide face cannot be provided with a wave shape in the peripheral direction by grinding, although this kind of solution would be advantageous in certain cases, as mentioned above.

According to principles of the invention, the distortion of the slide surface, previously regarded as a drawback, is utilized to provide the slide face with an advantageous wave shape, because in the invention the distortions are distributed on the periphery of the slide ring so that instead of becoming conical in shape the slide face becomes wave-like as seen from the direction of the slide face.

Figure 4:
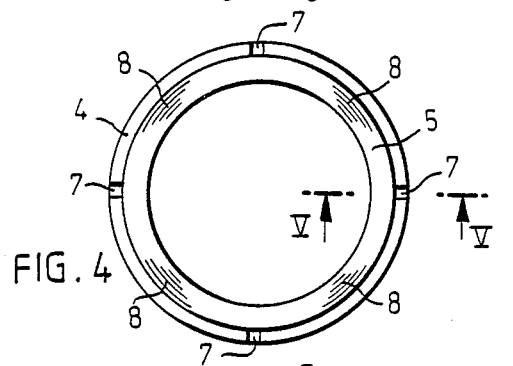
FIG. 4 is a front elevational view of a slide ring fastening solution according to the invention.
Figure 5:
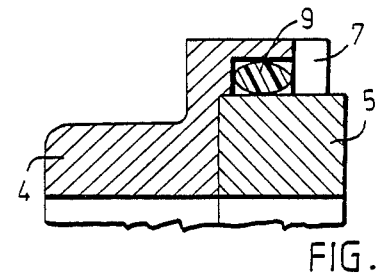
FIG. 5 is a fragmenary, enlarged-scale longitudinal cross-section sectional view taken along the line V—V of FIG. 4.
Figure 6:
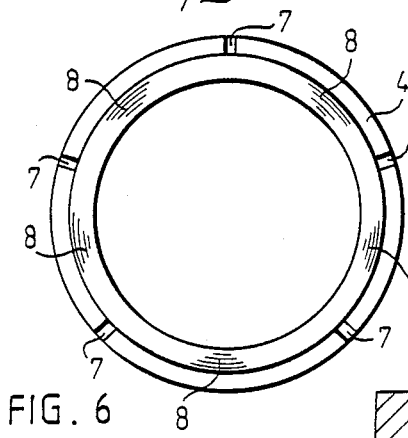
FIG. 6 illustrates another embodiment of the solution of FIGS. 4 and 5.
Figure 7:
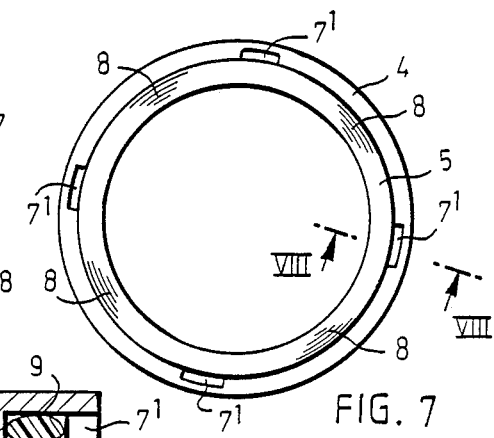
FIG. 7 is a front elevational view of another embodiment of the structure according to the invention.
Figure 8:
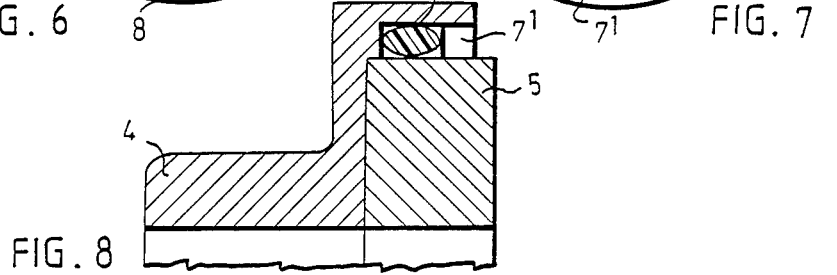
FIG. 8 is a fragmentary, enlarged-scale longitudinal cross-section sectional view taken along the VIII—VIII of FIG. 7.

This is achieved e.g., by means of the preferred embodiments shown in FIGS. 4 to 8. The same reference numerals as are used in FIGS. 1 to 3 are used in FIGS. 4 to 8 for designating corresponding parts. According to the invention, an axial counter surface of the seating ring 4 making contact with an axial peripheral surface of the slide ring 5 in the shrink fit is arranged to be discontinuous in the peripheral (i.e., angular, circumferential) direction. In the embodiment of FIG. 4, this discontinuity is obtained by providing the counter-surface with four uniformly spaced openings 7 going radially through the wall of the seating ring 4. In FIGS. 5 and 8, the reference numeral 9 further indicates an elastic seal fitted between the counter-surface of the seating ring 4 and the outer periphery of the slide ring. The embodiment of FIG. 6 differs from that of FIG. 5 merely in that there are provided five openings 7.

The solution described above enables the radial press effect of the shrink fit to be directed to the slide ring 5 by means of the discontinuous counter-surface of the seating ring so that the slide face is provided with peripheral height differences. In FIGS. 4 and 5, these height differences are illustrated by means of the shade lines 8. Wear grooves according to the shade lines 8 are formed in the slide ring when the ring rotates against the planar counter-surface of the other slide ring. By means of the invention, a feature previously regarded as a drawback, i.e., the distortion of the slide face, can be utilized when the slide face has to be provided with a peripherally wave-like shape for the achievement of hydrodynamic lubrication. By means of the hydrodynamic lubrication the abrasive friction between the slide surfaces can be reduced 10 to 30%. This implies that a pv-value (p=pressure, v=velocity) representing the operation of a slide ring pair is increased 10 to 30%. These advantages become particularly apparent with machines having a high rotational velocity, at high pressures and with large-diameter shafts as the sliding velocity increases with the shaft size.

FIGS. 7 and 8 illustrate an embodiment in which the discontinuity of the axial counter-surface of the seating ring 4 is achieved by providing the counter-surface with axially-extending recesses 7' positioned at uniform intervals in the peripheral direction.

The length of the points of discontinuity 7, 7' in the peripheral direction can be varied in various ways; however, it is to be preferred that the length of one opening 7 or recess 7' in the peripheral direction is at the most equal to that part of the counter-surface of the seating ring which is positioned between two adjacent openings or recesses.

The above embodiments are by no means intended to restrict the invention, but the invention can be modified within the scope of the claims in various ways. Accordingly, it is obvious that the number, size, and shape of the openings or the recesses is not restricted to the examples of the figures, but other kind of solutions are possible as well.

What is claimed is:

1. A slide ring seal for sealing between a wall part and a shaft part which is rotatable with respect to the wall part, about a longitudinal axis of the shaft part,
    said slide ring seal comprising:
    a first assembly comprising:
        a first seating ring adapted to be mounted on one of said parts, said first seating ring having means providing a circumferentially-extending first recess;
        a first slide ring received in said first recess and secured to said first seating ring, said first slide ring having an axially-presented first slide ring counter-surface which is exposed from said first seating ring; and
    a second assembly comprising:
        a second seating ring adapted to be mounted on the other of said parts, said second seating ring having means providing a second recess;

a second slide ring received in said second recess and secured to said second seating ring, said second slide ring having an axially-presented second slide ring counter-surface which is exposed from said second seating ring;

said means providing said second recess including an axially-facing inner end wall surface perimetrically-bounded by an axially-extending flange means having an axial length and a radial thickness, a radially inner counter-surface and a free end;

wave-forming means for forming a wave-like pattern on said counter surface of said second slide ring, said wave-forming means defining a plurality of angularly-spaced notches in said radially inner counter-surface extending from said free end at least part way through said axial length and radial thickness of said axially-extending flange means, said notches thereby dividing said radially inner counter-surface into a plurality of angularly-spaced radially inner counter-surface portions;

said second seating ring having said radially inner counter-surface portions disposed in interference-fit engagement with a radially outwardly-facing outer circumferential surface of said second slide ring for securing said second slide ring to said second seating ring;

said first slide ring counter-surface is coaxially disposed in surface-to-surface sliding engagement with said second slide ring counter-surface, whereby said second slide ring, including said second slide ring counter-surface, in use, is locally worn to a greater degree where surrounded by said radially inner counter-surface portions than where surrounded by said notches so as to become waveform in a circumferential direction of said second slide ring counter-surface with sites of greater wear being located angularly intermediate each respective pair of said notches closest to each other.

2. The slide ring seal of claim 1, wherein:
there are at least three of said notches, and said notches are equiangularly spaced form one another around said axially-extending flange means.

3. The slide ring seal of claim 2, wherein:
said notches extend completely through said thickness of said axially-extending flange means.

4. The slide ring seal of claim 2, further including:
means defining a radially inwardly-opening circumferential groove in said axially-extending flange means at a location spaced axially from said free end and axially beyond said notches; and
an elastic seal ring circumferentially received in said groove and disposed to seal with said radially outwardly-facing outer circumferential surface of said second slide ring.

5. The slide ring seal of claim 2, wherein:
said first slide ring counter-surface is substantially planar;
lubricant is received between said first and second slide ring counter-surfaces at angularly distributed sites where said second slide ring counter-surface is surrounded by respective said notches.

* * * * *